March 13, 1951  A. J. HORNFECK  2,544,790
MEASURING AND CONTROLLING SYSTEM
Filed Aug. 27, 1946  4 Sheets-Sheet 1

INVENTOR.
ANTHONY J. HORNFECK
BY
Raymond D. Jenkins
ATTORNEY

PHASE DIAGRAMS

March 13, 1951     A. J. HORNFECK     2,544,790
MEASURING AND CONTROLLING SYSTEM
Filed Aug. 27, 1946     4 Sheets-Sheet 4

*INVENTOR.*
ANTHONY J. HORNFECK
BY
Raymond W. Jenkins
*ATTORNEY*

Patented Mar. 13, 1951

2,544,790

UNITED STATES PATENT OFFICE 2,544,790

MEASURING AND CONTROLLING SYSTEM

Anthony J. Hornfeck, Lyndhurst, Ohio, assignor to Bailey Meter Company, a corporation of Delaware Application August 27, 1946, Serial No. 693,290

14 Claims. (Cl. 318—29)

This invention relates to a system for measuring and/or controlling the magnitude of a variable such as temperature, pressure, rate of fluid flow, position or displacement, although the variable may be of any chemical, physical, electrical, thermal or other characteristic.

In accordance with my invention variations in a variable quantity, quality or condition are translated into variations in an electrical effect, and this effect is then amplified solely through electrical or electronic means until sufficient power is available for doing useful work, such as moving an indicator or other exhibiting means, or for regulating the rate of application of an agent contributing to the production or maintenance of the variable.

In systems of the same general type at present known, wherein variations in the variable are translated into variations in an electrical effect, the necessary amplification is done, at least in part, by mechanical means. There are, therefore, variations in the magnitude of the variable translated into variations in an electrical effect which is then translated into a corresponding mechanical movement, such as the deflection of a galvanometer, and thence usually the mechanical movement is translated back to an electrical effect for operating the exhibiting or control device. Because of the small power available in the first electrical effect, such devices usually operate on a periodic or step by step principle. That is to say, upon a change in the variable the exhibiting or control device is not continuously operated in correspondence with such change or changes, but periodically by means of a feeler mechanism an exhibiting or control device is changed an amount corresponding to the amount of change in the variable during succeeding increments of time. Such step by step and feeler mechanisms are well known in the art.

It is evident that such devices are necessarily complicated and delicate and do not correctly exhibit the variable during transient periods. My invention is particularly concerned with the elimination of all mechanical movements between the sensitive device and the exhibiting or control device, leading to simplification and the removal of the usual time delay, so that the device accurately exhibits the magnitude of the variable even during transient periods. It is evident that many ancillary advantages will follow, among which may be mentioned as obvious the elimination of wear of mechanical parts and the elimination of the necessity of periodic inspections and adjustments to correct for inaccuracies occasioned by mechanical wear.

The great majority of low level D.-C. measuring systems, such as thermocouple potentiometer recorders, use a galvanometer for detecting or measuring the D.-C. input signals. The galvanometer is a relatively fragile device and is affected by mechanical vibration and is easily damaged by overload or mishandling. Vacuum tube or electronic amplifiers for low D.-C. voltages have not been successful because of instability and drift. A particular object of the present invention is to provide apparatus and a new method of detecting and amplifying small D.-C. voltages or currents. The present method involves the use of a device which I term a reactor converter, which converts a D.-C. signal of varying potential into a greatly amplified A.-C. signal of varying potential. If the D.-C. signal reverses in polarity a consequent reversal of phase is effected in the A.-C. signal. The apparatus includes a pair of iron core reactors and has all of the sensitivity of the galvanometer as well as the sturdiness of a transformer. There are no delicate moving mechanical parts to wear out or become damaged.

The reactor converter produces a greatly amplified A.-C. output signal of reversing phase, which is supplied to a phase sensitive electronic amplifier and motor control circuit. In this way a thermocouple having an output of only a few millivolts is used to position a reversing motor with no intermediate mechanical or moving parts. The reversing motor may then position an indicator or recorder and at the same time a potentiometer for balancing the system, which may be of the null type.

A particular object of my present invention lies in the amplifying and motor control circuit arrangement, whereby increased sensitivity as well as an increased speed of rebalancing is accomplished without undue overtravel or hunting, which in the past has almost invariably accompanied circuit arrangements which were primarily adapted for high speed operation.

Figure 1:
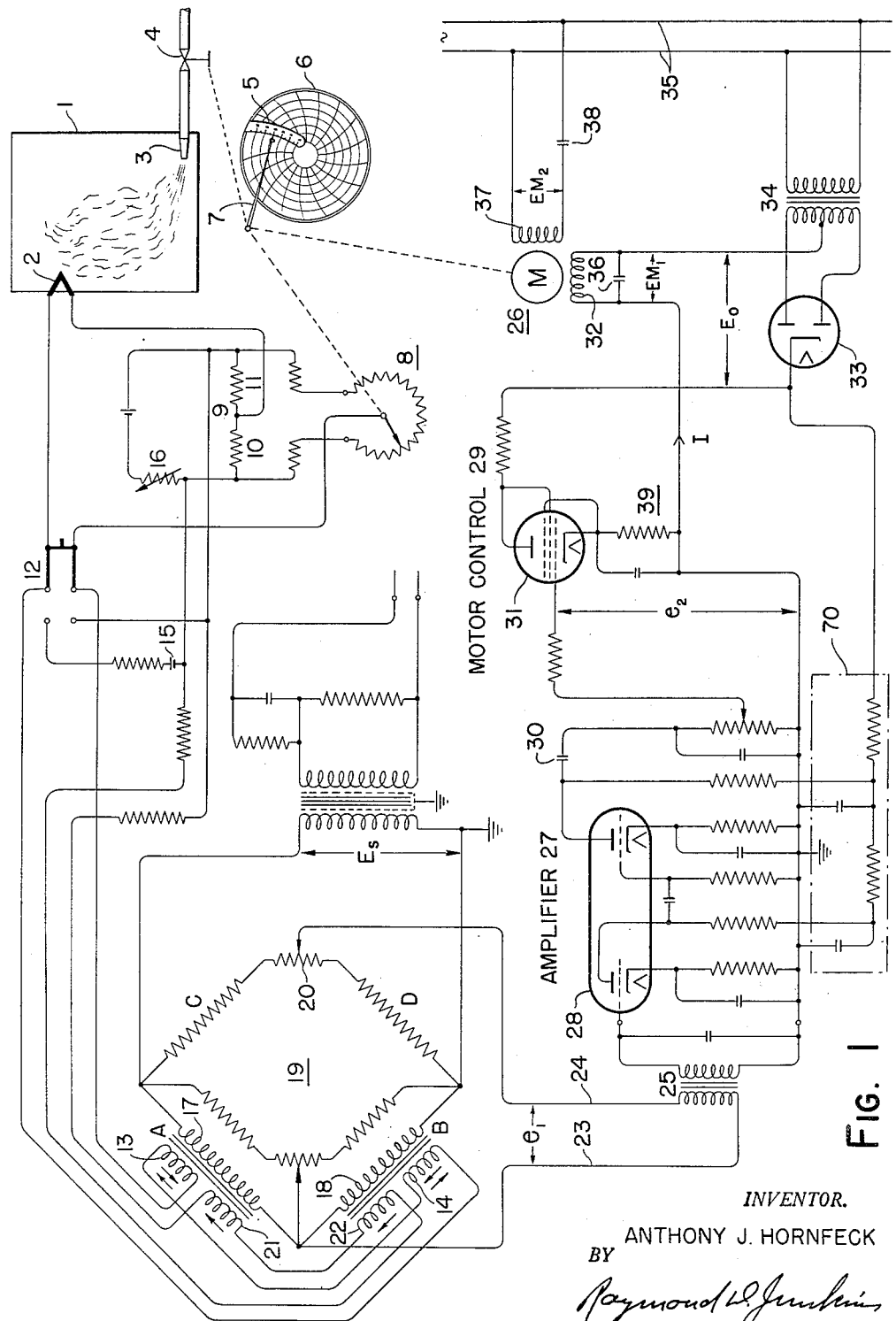
Fig. 1 is a wiring diagram for a thermocouple potentiometer measurement and control of temperature.

Referring now specifically to Fig. 1, I show therein a complete wiring diagram for the measurement and control of temperature within a furnace 1 through the measurement of the D.-C. voltage generated by a thermocouple 2 which is sensitive to the temperature within the furnace; the furnace being supplied by fuel through a burner 3 having a control valve 4. Desirably the temperature of the furnace is indicated on a scale 5 and recorded on a time revoluble chart 6 through the agency of a recording pen 7. The thermocouple 2 is connected in a standard potentiometer circuit including a balancing potentiometer resistance 8. The cold junction 9 is located between manganin coil 10 and nickel coil 11 comprising compensation for changes in cold junction temperature.

A double-pole double-throw switch 12 is provided for the D.-C. input. In the position shown, for normal operation, the thermocouple-potentiometer system is connected to the input windings 13 and 14 of the reactor converters A and B. With the switch 12 thrown to its alternate position the potentiometer circuit is disconnected and a standard cell 15 is connected for checking the system. An adjustable resistance 16 is provided in the potentiometer circuit in known manner.

The A.-C. impedance windings 17, 18 of the reactor converters A, B are connected in adjacent legs of a Wheatstone bridge 19 having opposite fixed resistance legs C and D. An adjustable resistance 20 is connected in series between the resistances C and D.

The reactor converters A, B have bias D.-C. windings 21, 22 respectively. The interaction of the D.-C. windings 13, 21 of the reactor converter A and the interaction of the D.-C. windings 14, 22 of the reactor converter B controls the reactance of the A.-C. windings 17, 18. As fully disclosed and claimed in my copending application Ser. No. 544,586, filed July 12, 1944, now Patent 2,447,338, dated August 17, 1948, the action of the reactor converter is one of changing a low level direct current signal of given polarity into a greatly amplified alternating current signal of given phase and of reversing the phase of the alternating current signal 180° when the polarity or sign of the direct current signal is reversed. This is accomplished by the alternating current bridge 19 having two fixed resistance legs C and D and the two A.-C. reactance windings 17, 18 in the remaining legs of the bridge.

The phase of the A.-C. output current or voltage depends upon the polarity of the D.-C. input circuit, while the magnitude of the A.-C. output of the bridge 19 depends upon the magnitude of the D.-C. signal. In other words, the phase of the A.-C. signal output of the bridge 19, effective across the conductors 23, 24 upon the primary side of transformer 25, relative to the supply Es to the bridge, depends upon the polarity of the D.-C. input to the control windings 13, 14, while the magnitude of the signal applied to the primary of transformer 25 depends upon the magnitude of the D.-C. signal applied to the control windings 13, 14.

Current flow through the A.-C. windings 17, 18 is inhibited or controlled by a control of the reactance of said windings. The polarity and value of the current flow in the D.-C. windings 13, 14 is determined by the unbalance of the potentiometer measuring circuit, and the unbalance of the potentiometer measuring circuit is equal to the change of the thermocouple potential produced by a change in the temperature within the furnace 1.

For positioning the indicator pointer 7, the balancing resistance 8, and the control valve 4, I provide a motor indicated generally by the numeral 26. Between the A.-C. output transformer 25 and the motor 26 is a two-stage amplifier 27 including a double triode electron tube 28, preferably of the 6SL7 type. A departure of the thermocouple voltage from any given value produces an output of the transformer 25 proportional to the departure and of a phase depending upon the direction of the departure. A reversal in phase of the output of the transformer 25 acts through a motor control circuit 29 to effect an operation of the motor 26 in one direction or the other to vary the potentiometer 8 in proper sense to rebalance the system.

As previously stated, the phase of the output voltage of the transformer 25 depends upon the polarity of the direct current input to the reactor converter bridge 19, and consequently upon the direction of change of the voltage produced by the thermocouple 2. Likewise, the phase of the output voltage of the amplifier 27 will depend upon the sense of change in the input to the reactor bridge 19. All or part of the output voltage of the amplifier is impressed upon the motor control circuit 29. The motor control circuit 29 is arranged to sense the phase of the output of the amplifier and consequently the unbalance of the measuring circuit, and is, therefore, adapted to effect an operation of the motor to rebalance the measuring circuit.

The control circuit consists of a single tube 31, preferably of the high Gm or mutual conductance type, such as the 6AG7. This tube is connected in series with a control winding 32 of the motor 26. The plate voltage for the tube 31 is unfiltered pulsating D.-C. voltage obtained from a full wave rectifier tube 33 of the 6X5 type, receiving its power from a transformer 34 connected to the alternating current power source 35. The voltage output of the amplifier 27, produced by an unbalance of the measuring circuit, is applied to the grid of the motor control tube 31. This voltage applied to the control grid will cause an increase in the no-load plate current during the half cycle when it is in phase with the plate voltage and a decrease during the half cycle it is out of phase. As a result, with a large grid signal, half wave pulses of D.-C. current will flow into the motor circuit comprised of the control winding 32 and the capacitor 36 in parallel. This is shown in graphs 6 and 7 of Fig. 2. The phase of this pulsating current depends on the phase of the grid signal, and consequently on the direction of unbalance of the measuring circuit.

The motor 26 is in effect a two-phase motor which may be described as being a capacitor-run induction motor having a two phase stator winding and a high resistance squirrel cage type rotor. There are two identical but separate windings 32, 37, the winding 37 being connected in series with a capacitor 38 across the A.-C. power line 35 so that its voltage EM2, leads the line voltage by nearly 90 degrees. The capacitor 38 is chosen so that it is in resonance with the inductance of the winding 37 at the operating frequency and forms a series resonant circuit. This results in a voltage across the winding 37 which is approximately double the line voltage for the particular motor used.

The second winding 32, which I will term the control winding, while identical with the first winding 37 in construction, differs in that it has a capacitor 36 connected in parallel across it. The capacitor 36 is designed to produce a condition of parallel resonance at 60 cycles. The plate of the motor control tube 31 is always positive. At balance, some current flows during each half cycle of the applied plate voltage, as shown in graphs of Fig. 2, but since this current is only slightly pulsating direct current and has no fundamental component of supply line frequency, no output torque on the motor is produced. Any tendency of the rotor to coast is restrained by the damping action of the D.-C. component which applies a braking action. As balance is approached from an unbalanced condition, there results a reduction in the fundamental component of supply line frequency in the output circuit of tube 31 and a consequent and simultaneous increase in the D.-C. component which produces a dynamic braking action and prevents overtravel.

When the measuring circuit is unbalanced, the half-wave pulsating current which flows from the motor control tube 31 into the winding 32 and capacitor 36 has a large fundamental 60 cycle component retaining as well higher frequency harmonic components and the D.-C. component which gives the braking action upon motor rotation. However, this parallel circuit is tuned so that the capacitor 36 is in resonance with the winding 32 inductance for 60 cycles. This produces a large A.-C. voltage $EM_1$ of 60 cycle frequency across the motor winding 32, but reduces the harmonics to a minimum since the parallel resonance circuit acts like a very high impedance to 60 cycle current, but a relatively low impedance to harmonics. In this arrangement the motor tube current may be only 12 milliamps with 30 milliamps or more alternating current in the control winding 32. This A.-C. control winding voltage lags or leads the main winding 37 voltage by approximately 90 degrees, as shown in graphs 8 and 9 of Fig. 2, depending on the phase of the control tube 31, grid voltage and direction of unbalance of the measuring bridge 19. Consequently the motor 26 will run as a two-phase motor in a direction determined by the phase relationship of the winding voltages and rebalance the circuit.

The D.-C. power supply for the amplifier 27 of the circuit is obtained from the same source as the motor control circuit 29. The filtering to obtain the required smooth D.-C. is done by a resistance-capacitance filter 70. This use of a common voltage supply for 27 and 29 is one of the simplifying features of my invention. The use of pulsating rather than filtered D.-C. on the plate circuit of the control tube 31 simplifies the circuit and obtains increased sensitivity, and is another feature.

The motor is of a low inertia rotor type having high impedance windings. The speed of response of the motor to amplifier signal is far higher than previous systems because of the low motor inertia and the absence of time lag in the motor control circuit. Stability is obtained with total travel time of full scale indicator or recorder operation of approximately one second, and with a sensitivity of one-tenth percent or better. At this speed of travel and sensitivity, a sudden change in the input signal will produce a single cycle of overshoot or about one percent maximum.

Figure 2:
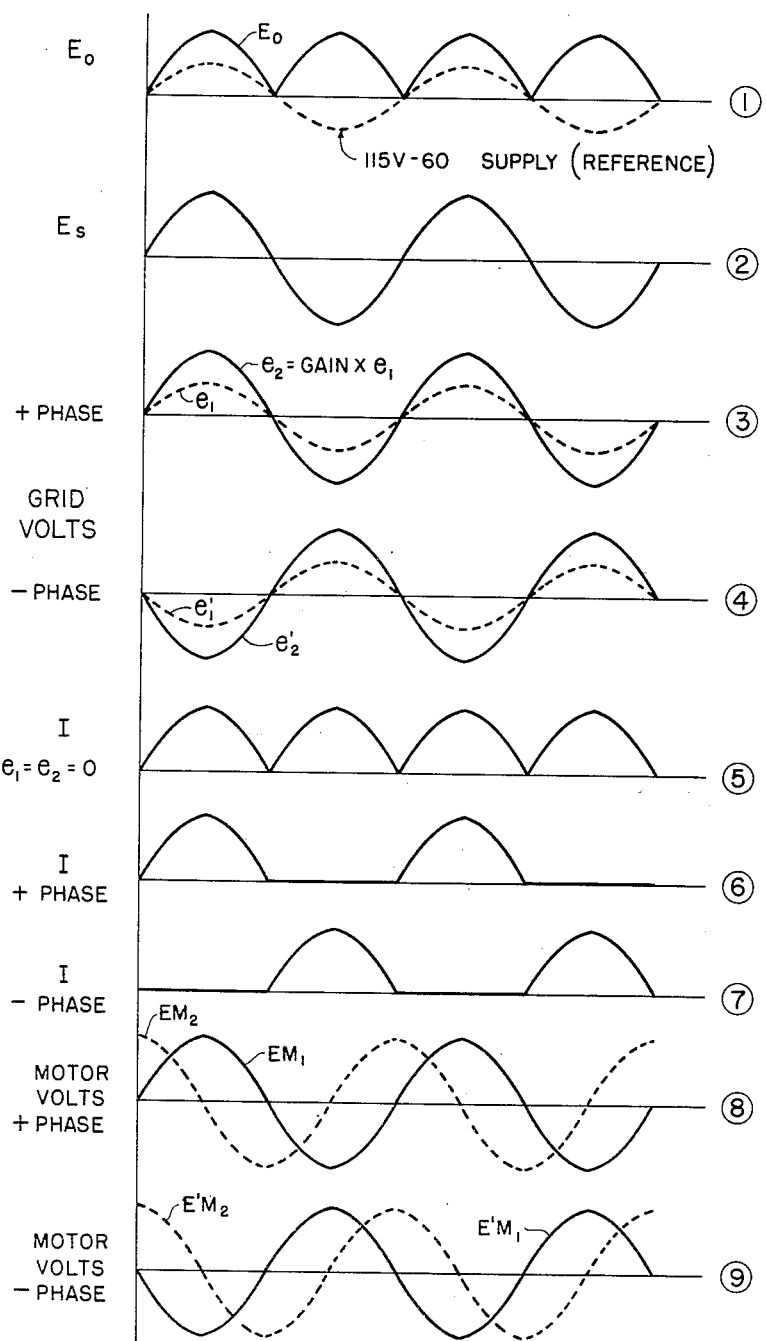
Fig. 2 is a family of graphs in connection with my improved amplifying and motor control circuit.

Referring now to Fig. 2, I show therein a family of phase diagrams in connection with the circuit which I have just described.

1 illustrates the unfiltered output of the full wave rectifier 33. It is the total voltage applied to the motor control circuit 29 including tube 31 and motor control winding 32.

2 shows the supply voltage to the measuring bridge. It is in phase with the line voltage of supply 35.

3 and 4 illustrate the bridge unbalance corresponding to the output of the thermocouple 2 which results from an assumed increase and decrease respectively in temperature of the furnace 1. These graphs show the bridge unbalance voltage $e_1$ which is the input to the amplifier section 27, and $e_2$ the output voltage from the amplifier which is the input to the motor control circuit 29.

5 plots the control tube current I for a balanced bridge condition. This is primarily D.-C. with large 120 cycle component but no 60 cycle.

6 and 7 show the plate current of control tube 31 for an increase and decrease (respectively) in the thermocouple output which produced the control signal voltages of 3 and 4.

8 shows the motor voltages across the windings 32, 37 for conditions 3 and 6 wherein $EM_2$ leads $EM_1$ by 90 degrees to produce rotation in one direction.

9 depicts the motor voltage for conditions 4 and 7 wherein $EM_2$ lags $EM_1$ by 90 degrees to produce rotation in the opposite direction.

It will thus be seen that the circuit described in connection with Figs. 1 and 2 provides an alternating current measuring bridge 19 which may be unbalanced in one direction or another by variations in a direct current signal supplied to the bridge from a thermocouple 2 sensitive to temperature within the furnace 1. When the balance of the bridge 19 is disturbed, through change in thermocouple output in one direction or the other, its alternating current output $e_1$ is of a phase and magnitude representative of the direction and extent of bridge unbalance. Such output $e_1$, applied to the amplifier 27, produces an amplified A.-C. signal $e_2$ of phase and magnitude representative of bridge unbalance, which is aplied to the motor control 29, resulting in rotation of the motor 26 in one direction or the other dependent upon the direction of unbalance. Such motor rotation is in proper direction to position the balancing potentiometer 8 to rebalance the measuring circuit and decrease the bridge output $e_1$ to zero. As the system approaches balance considerable braking action is effective on the rotor, which reduces the tendency to overtravel and hunting.

Simultaneously with the positioning of the balancing potentiometer 8 the motor 26 moves the indicator pen 7 an amount representative of change in temperature at the thermocouple 2 so that the indicator 7 continuously indicates on the scale 5 and records on the chart 6 the actual temperature existing at the thermocouple 2.

At the same time, the motor 26 operates through suitable connecting means to effect a positioning of the control valve 4 for regulating the supply of fuel to the furnace so as to return the temperature within the furnace to the desired value, and thus maintain a predetermined temperature within the furnace.

The amplifier and motor control circuit provides a sensitive and simple system for measuring and controlling variables. I have chosen to illustrate as a preferred embodiment the measurement and control of temperature within a furnace which is relatively slow in response. However, because the system described is capable of fast response, it is particularly suitable for the measurement and control of rapidly changing variables. The measuring and controlling may also be accomplished independently.

While the direction of rotation of the motor 26 is determined by and dependent upon the sense of unbalance of the bridge 19, the speed of rotation of the motor is determined by the magnitude of unbalance, the magnitude of the signals $e_1$, $e_2$, and the output of the motor control tube 31, namely, the current I and the voltage $EM_1$ applied to the control winding 32. The current and voltage $EM_2$ applied to the power winding 37 remain constant. As the bridge returns toward balance with consequent decrease in value of current I and of voltage $EM_1$ applied to the control winding 32, the A.-C. driving torque effective upon the rotor of the motor 26 decreases. Simultaneously the D.-C. component increases and applies a damping or braking action upon the rotor, which is the same as increasing motor load. Thus, as balance is approached the rate of decrease in speed of rotation of the motor 26 increases and overtravel of the system is minimized. The direction of rotation of the motor is dependent upon the direction of unbalance of the measuring bridge, while the speed of rotation is dependent upon both the power applied to the winding 32 and the D.-C. component through the winding.

The D.-C. component is reduced as the degree of unbalance increases and motor rotation is opposed only by the fundamental component in the D.-C. to the degree of its magnitude, thereby maintaining a varying degree of damping on the motor rotation.

Figure 3:
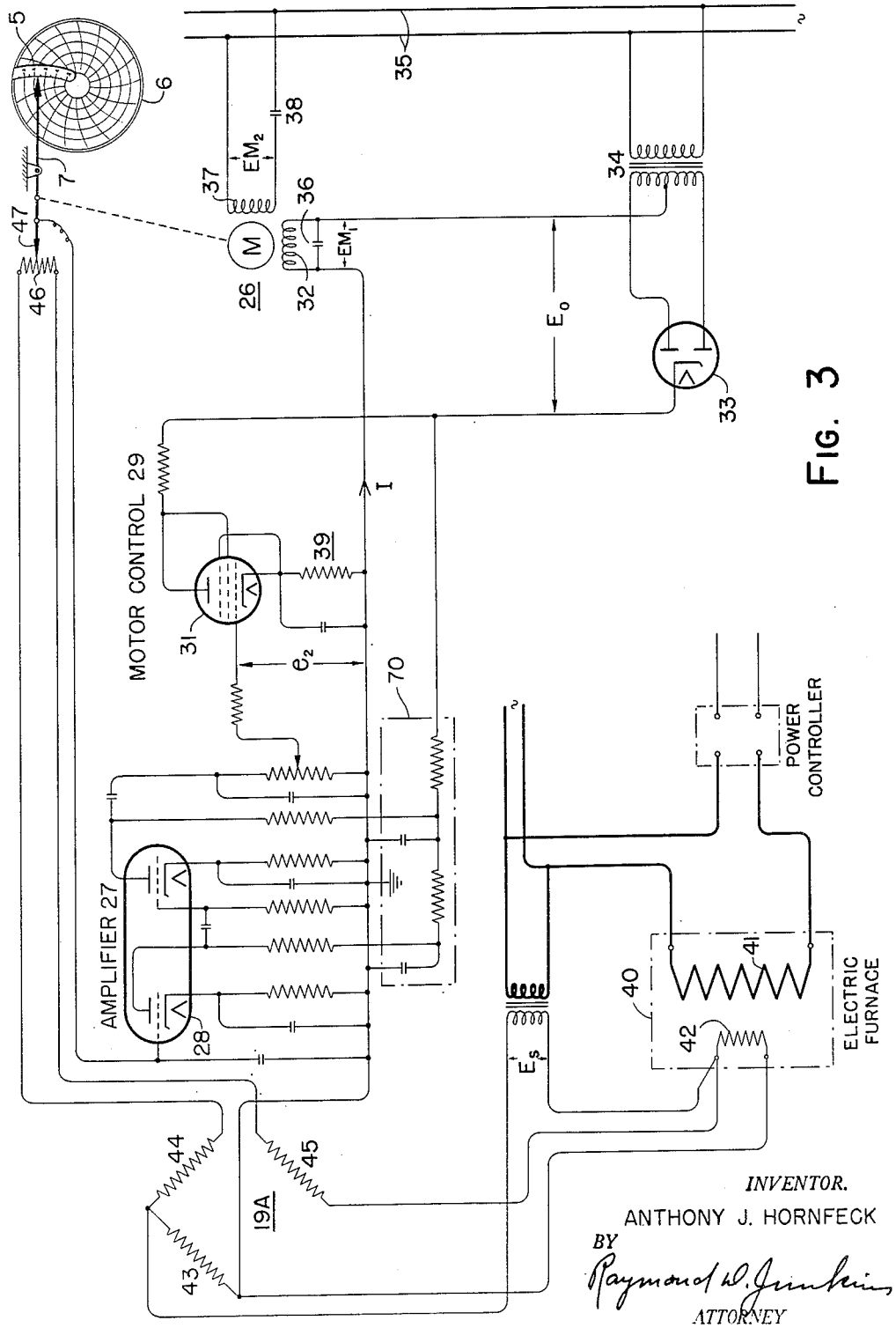
Fig. 3 is a wiring diagram of a system for the measurement of temperature utilizing a resistance thermometer.

Referring now to Fig. 3, I show therein a second embodiment of my invention in connection with the measurement of temperature within an electric furnace 40 which is heated through the agency of a power winding 41. The arrangement illustrated in Fig. 3 provides a resistance thermometer for measuring the temperature within the furnace 40. Sensitive to such temperature I show a winding 42 forming one leg of an alternating current bridge 19A and whose resistance varies with temperature of the furnace. The bridge 19A includes three resistance legs 43, 44 and 45, between the latter two of which is an adjustable resistance 46 having a movable arm 47 comprising an extension of the indicator arm 7. Following an unbalance of the bridge 19A the motor 26 is arranged to position the contact arm 47 and divide the resistance 46 between the resistances 44 and 45 for returning the bridge to balance. In general, the amplifier 27 and motor control 29 of Fig. 3 are similar in arrangement and function to those previously described in connection with Fig. 1. When temperature within the furnace 40 departs in one direction or the other, the bridge 19A becomes unbalanced and an alternating current signal is applied to the amplifier 27 of a phase determined by the sense of bridge unbalance and of a magnitude determined by the extent of bridge unbalance. The current I and voltage $EM_1$ applied to the control winding 32 of the motor 26 are of a phase and magnitude determined by the direction and magnitude of bridge unbalance and cause the motor to rotate in desired direction for rebalancing the bridge and for simultaneously producing an indication and/or record of the actual temperature existing at the resistance element 42.

Figure 4:
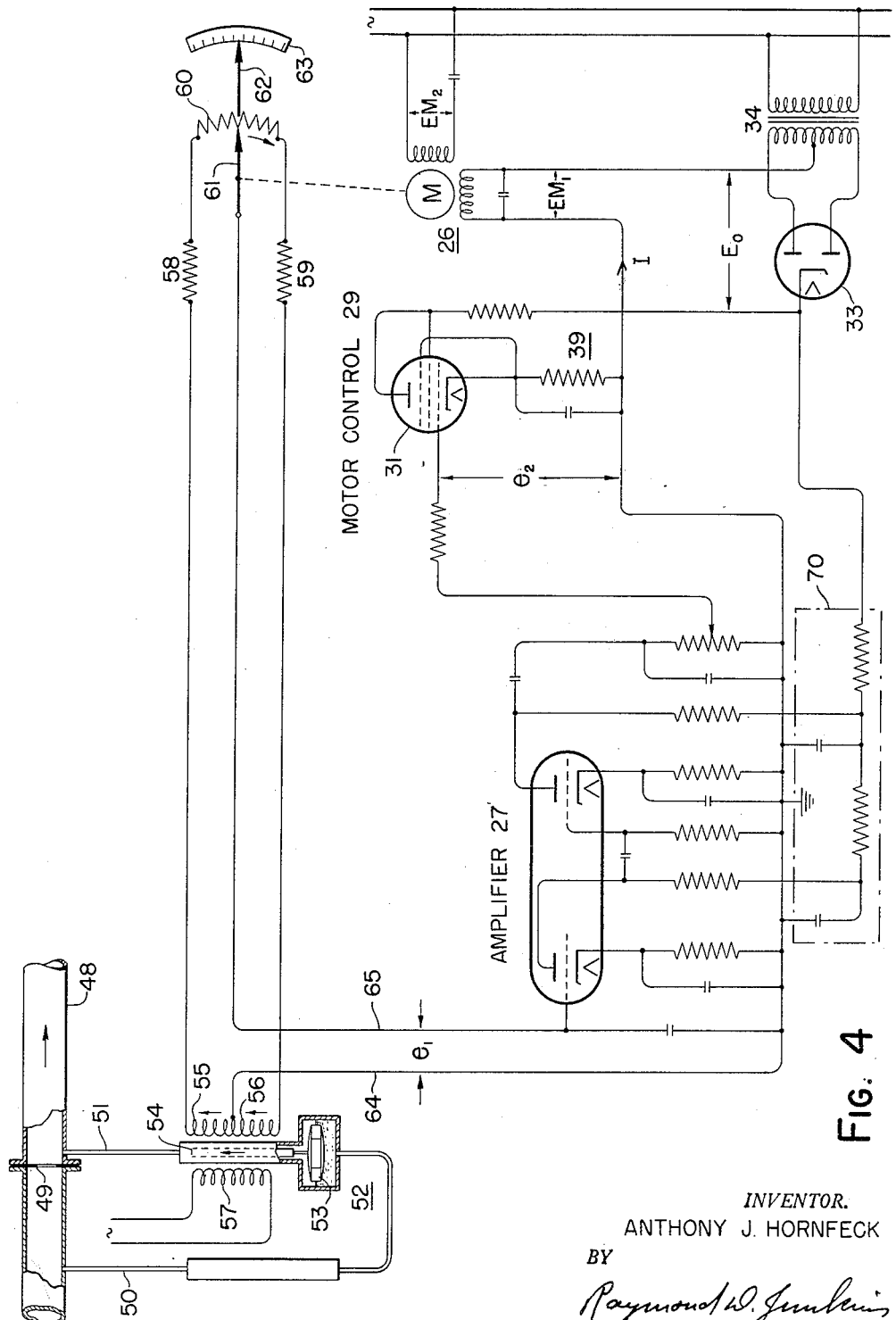
Fig. 4 is a circuit diagram of a telemetric system embodying my invention.

Referring now to Fig. 4, I show therein an embodiment of my invention as applied to a telemetric system for measuring and for remotely indicating the instantaneous value of a variable, such for example as of the rate of flow of a fluid through a conduit 48. Positioned in the conduit 48 is an orifice or similar restriction 49, to opposite sides of which are connected the pressure pipes 50, 51 joining to form a mercury filled U-tube 52.

Positioned in one leg of the U-tube 52 is a float 53 riding upon the surface of the mercury and adapted to position a magnetic core piece 54 relative to secondary windings 55, 56 of a movable core transformer having an alternating current energized primary 57.

The secondary windings 55, 56 are included in a network having fixed resistors 58, 59 as well as a divisible resistance 60 over which is positionable a contact arm 61. The contact arm 61 has an indicator extension 62 positionable relative to an indicator scale 63.

It will be seen that the secondary windings 55, 56, the fixed resistances 58, 59, and the adjustable resistance 60, are all connected in series loop with no external source of power connected thereto. The power for the network is derived from the magnetic coupling of the secondary windings 55, 56 with the primary winding 57 through the agency of the coupling 54.

A conjugate conductor 64, 65 joins the midpoint of the secondary windings 55, 56 with the adjustable contact 61. If the system is in balance the voltage $e_1$ across the conductor 64, 65 will equal zero. Upon a condition of unbalance then the voltage $e_1$ will be of a phase and magnitude dependent upon the sense and magnitude of the unbalance. The signal $e_1$ is applied to the amplifier 27 for control of the motor 26 which positions the contact 61 in proper direction to rebalance the system.

Assuming a condition of balance within the system, then, if the rate of flow of the fluid through the conduit 48 varies in one direction or the other, the float 53, and consequently the magnetic coupling element 54, will be moved upwardly or downwardly a proportional amount, thus varying the coupling between the primary 57 and the secondaries 55, 56 with the result that the measuring network including said secondaries becomes unbalanced and the voltage across the conjugate conductors 64, 65, namely, $e_1$, will be of a phase and of a magnitude in accordance with the direction and extent of unbalance. Control of the motor 26 through the agency of the amplifier 27 and motor control 29, responsive to the signal $e_1$, is similar to that described in connection with the previous figures of the drawing.

While I have chosen to illustrate and describe certain preferred embodiments of my invention, it will be understood that this is by way of illustration only, and not to be considered as limiting.

What I claim as new, and desire to secure by Letters Patent of the United States, is:

1. Apparatus comprising means responsive to the magnitude of a variable and operating to establish an A.-C. potential varying 180° in phase relative to a source of A.-C. in accordance with the sense of change in the magnitude of said variable, a thermionic tube having a grid and a plate, means for energizing said grid from said A.-C. potential, means for subjecting said plate to a pulsating D.-C. voltage, each pulse having a wave shape corresponding to a half wave of the voltage at said source and the pulses being alternately in phase and 180° out of phase with the half wave portions of the source voltage, an induction type motor having a pair of stator windings, means connecting one of said windings to said source, means connecting the other winding in series with the output circuit of said tube, and means for shifting the phase of the voltage applied to one of said windings so as to provide an operating torque for the motor under either phase condition of said established A.-C. potential.

2. The apparatus of claim 1 in which a full wave rectifier is energized from said source of A.-C., and said plate is subjected to the unfiltered D.-C. from said rectifier.

3. In a system of the type described, in combination, means responsive to the magnitude of a variable for establishing an A.-C. potential of reversible phase relative to a source of A.-C. in accordance with the sense of change in said magnitude, an electron discharge device having a grid energized from said reversible phase potential, an anode and cathode for said device, a full wave rectifier energized from said source and connected into a circuit including said anode and cathode so as to subject the anode to an unfiltered pulsating D.-C., an induction type motor having a first stator winding, said winding being connected to said source, a condenser connected in series with said winding, a second stator winding, said second winding being connected directly in series in said anode, cathode, rectifier circuit.

4. The system as defined in claim 3 in which a condenser shunts the second stator winding to reduce harmonics in the winding.

5. The system as defined in claim 3 in which a condenser shunts the second stator winding, said condenser being of such capacity as to resonate with said winding at the frequency of said A.-C. source to exclude therefrom the no-load current of the discharge device.

6. A motor control system comprising in combination, a source of A.-C.; means for producing a control potential reversible in phase in respect to said source on changes in a condition to be measured; an electron discharge device having a grid energized in accordance with said potential, an anode and cathode; a full wave rectifier energized from said source; a series circuit joining said rectifier with said cathode and anode so as to subject the anode to an unfiltered pulsating D.-C.; an induction type motor having a first stator winding; a condenser; said winding and condenser being connected in series to said source and resonating at the frequency thereof; a second stator winding; a second condenser; said last mentioned winding and condenser being connected together in parallel and adjusted to resonance at the frequency of said source, said parallel connected parts being series connected in said series circuit.

7. The motor control system of claim 6 in which means are connected in said circuit at the cathode of said discharge device for providing a filtered cathode bias for said discharge device.

8. In a system for controlling the direction of rotation of a motor dependent upon the magnitude of a variable, in combination, means responsive to said magnitude for establishing a low A.-C. potential of a phase relative to a source of A.-C. in accordance with the sense of change in said magnitude, an amplifier comprising a pair of thermionic tubes, coupling means between said tubes, means applying said potential to the grid of the first tube, each of said tubes having a plate, a motor control thermionic device having a grid energized from the output circuit of said amplifier, a cathode and an anode; a full wave rectifier energized from said source, means connecting the rectifier to the anode-cathode circuit of said motor control device so as to subject the anode to a pulsating D.-C., an induction type motor having a stator winding, a condenser, means connecting said winding and condenser to said source; a second stator winding, a condenser shunting said second winding, said second winding and condenser being connected in series between the motor control device and said rectifier whereby the direction of motor rotation depends on the phase of said potential, a conductor for supplying the plates of said amplifier tubes from said rectifier, a pair of resistors in series in said conductor, the plate from the last amplifier tube being connected between said resistors and the other plate to the remote end of the second one of said resistors, and a separate condenser connecting each plate to resistor junction and ground.

9. A temperature measuring device comprising a Wheatstone bridge having four ratio arms and two conjugate conductors, a resistance in one of the ratio arms variable in accordance with the temperature to be measured, a source of alternating current in one of the conjugate conductors, a balancing resistance in another of the ratio arms and means for varying said balancing resistance to maintain it in predetermined ratio to said variable resistance comprising a thermionic amplifier including input and output circuits, means electrically connecting the input circuit to said second conjugate conductor; a motor control thermionic device having a grid energized from the output circuit of said amplifier, a cathode and an anode; a full wave rectifier energized from said source, means delivering a portion of the output of said rectifier to the anode-cathode circuit of said motor control device so as to subject the anode to unfiltered pulsating D.-C. and a portion to the output circuit of the amplifier, said means for varying said balancing resistance comprising an induction type motor having a first stator winding, a condenser, means connecting said winding and condenser to said source, a second stator winding, a condenser shunting said second winding, said shunted winding being connected directly in series in the anode, cathode, rectifier circuit.

10. The temperature measuring device of claim 9 in which the first winding and condenser are in series resonance at the frequency of the said source and the second winding and condenser are in parallel resonance at said frequency.

11. A rate of flow meter comprising in combination, a primary winding energized from a source of A.-C., a relatively fixed secondary having a center tap, a chamber containing a liquid, a magnetic element positioned in accordance with changes in the level of the liquid for varying the magnetic coupling between said primary and the two parts of the secondary windings in accordance with changes in the position of the element, means to vary the liquid level in accordance with differences in pressure on two sides of an orifice in a flow channel, a potentiometer connected between opposite ends of said secondary winding and having a slider, a conjugate conductor between said mid tap and said slider, a thermionic amplifier having an input circuit energized from said conjugate conductor and an output circuit; a motor control tube having a grid energized from said output circuit, a cathode and an anode; a full wave rectifier energized from said source, means delivering the output of said rectifier to the output circuit of said amplifier, and to the anode-cathode circuit of said tube so as to subject the anode to an unfiltered pulsating D.-C., an induction type motor mechanically connected to said slider to position the same to balance the transformer-potentiometer circuit, a first stator winding for said motor energized from said source, a second stator winding connected in series with the cathode-anode circuit of said tube, a condenser shunting the second winding and a condenser in series with the first winding to dephase said windings to provide rotational torque for said motor.

12. The meter as defined in claim 11 in which partial filtering of the output of said rectifier is provided to produce direct current for braking the motor when balance is approached.

13. In a system for controlling the direction of rotation of a motor dependent upon the magnitude of a variable, in combination, means responsive to said magnitude for establishing a low A.-C. potential of a phase relative to a source of A.-C. in accordance with the sense of change in said magnitude, an amplifier comprising at least one electronic device having a grid energized from said potential and an anode; a motor control thermionic device having a grid energized from the output circuit of said amplifier, a cathode and an anode; a full wave rectifier energized from said source, means connecting the rectifier to the anode-cathode circuit of said motor control device and to the output circuit of the amplifier, the connection to said anode-cathode circuit being such as to subject said anode to a pulsating D.-C. an induction type motor having a stator winding, means connecting said winding to said source; a second stator winding, said second winding being connected in series between the motor control device and said rectifier, means to dephase said windings for both phase conditions of said amplified low A.-C. potential to provide operating torque for said motor, and means to eliminate rectifier harmonics from said second winding.

14. In a thermo-couple temperature measuring circuit, in combination, a Wheatstone bridge having a pair of balanced impedance arms, a second pair of arms each comprising impedance winding of a saturable core reactor; each saturable core reactor having a core, a bias winding and a measuring winding; a thermocouple-potentiometer system having a battery and slide wire, means connecting the output of said system to said measuring windings, means to fixedly energize said bias windings, a source of A.-C. energizing one conjugate of said bridge, an amplifier for the potential in the other conjugate of the bridge; said amplifier including a thermionic device, an input circuit and an output circuit, means connecting said last mentioned conjugate to said input circuit, a motor arranged to actuate said slider to balance the potentiometer system and bridge, a winding for said motor directly energized from said source, a second winding for said motor, a full wave rectifier energized from said source, means energizing said output circuit directly from said rectifier through said second winding, said second winding being tuned to exclude the double frequency of said A.-C. in the output of said amplifier and means to dephase said windings to provide rotational torque for said motor.

ANTHONY J. HORNFECK.

REFERENCES CITED

The following references are of record in the file of this patent:

UNITED STATES PATENTS

| Number | Name | Date |
|---|---|---|
| 2,222,947 | Harrison | Nov. 26, 1940 |
| 2,246,686 | Jones | June 24, 1941 |
| 2,300,742 | Harrison et al. | Nov. 3, 1942 |
| 2,306,479 | Jones | Dec. 29, 1942 |
| 2,310,955 | Hornfeck | Feb. 16, 1943 |
| 2,352,103 | Jones | June 20, 1944 |
| 2,367,746 | Williams | Jan. 23, 1945 |
| 2,380,947 | Crosby | Aug. 7, 1945 |
| 2,423,534 | Upton | July 8, 1947 |